July 16, 1957 J. K. ARMSTRONG ET AL 2,799,782
ENGINE-GENERATOR UNIT
Filed Jan. 4, 1956 14 Sheets-Sheet 2
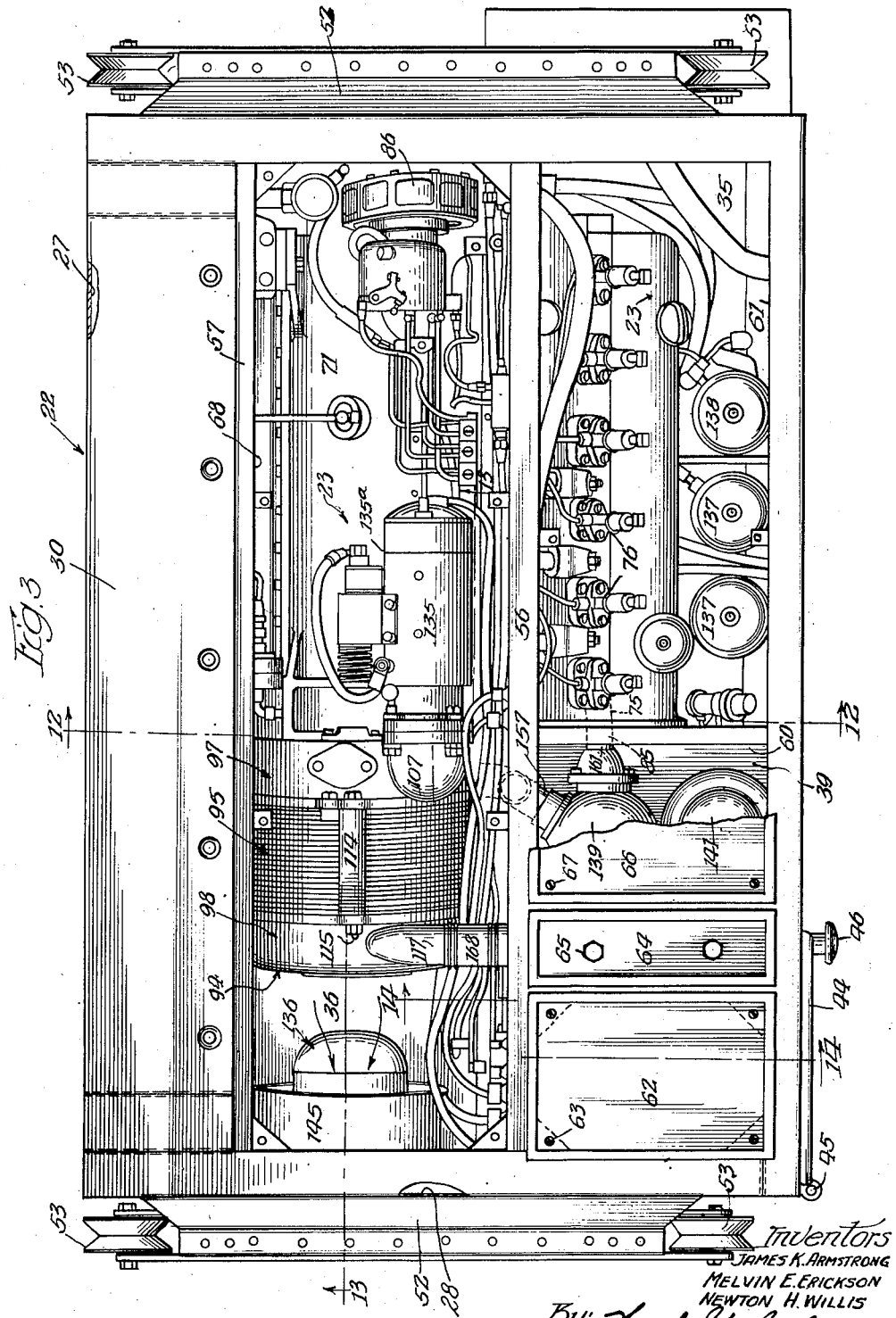
Inventors
JAMES K. ARMSTRONG
MELVIN E. ERICKSON
NEWTON H. WILLIS
By: Fred Gerlach atty.

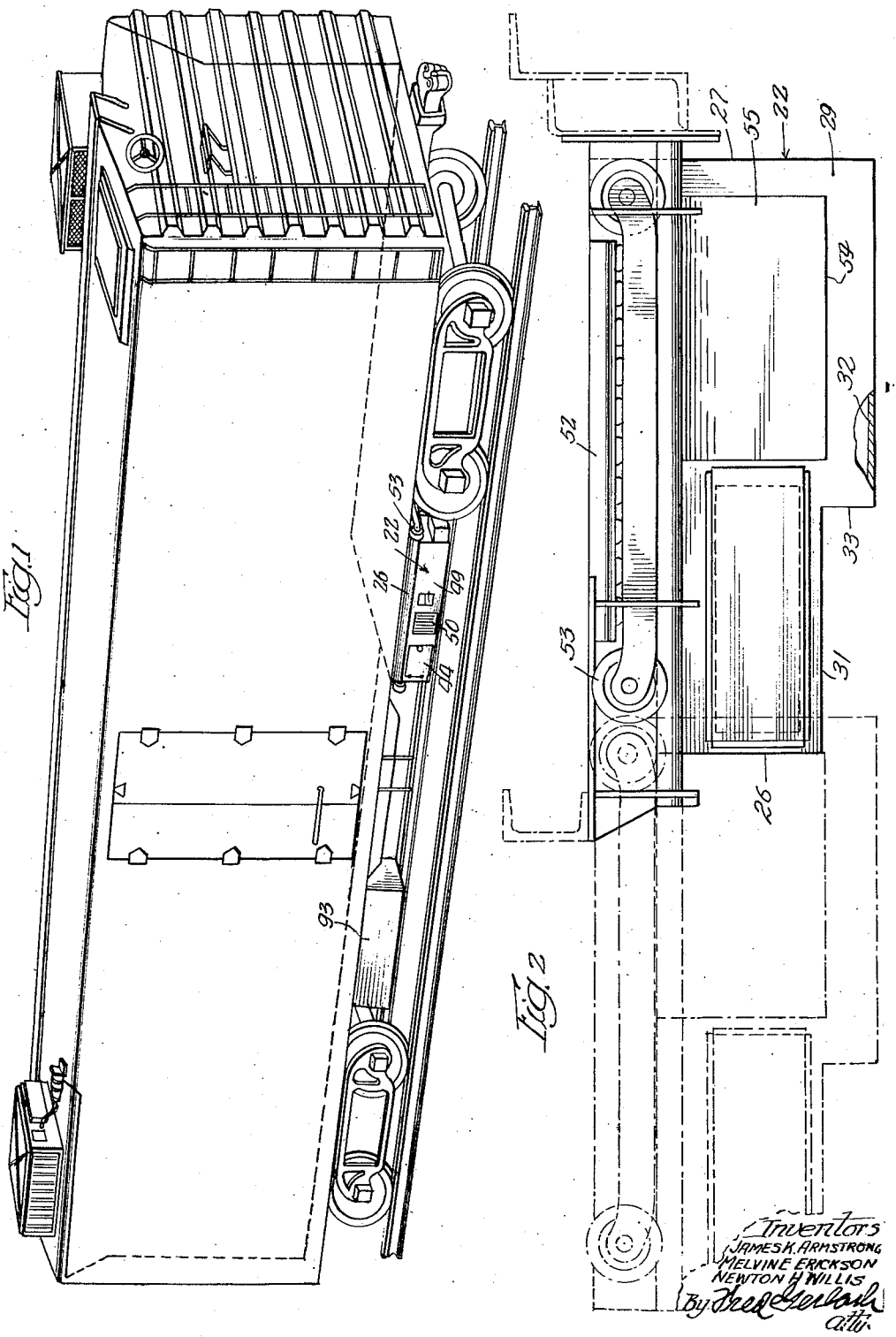

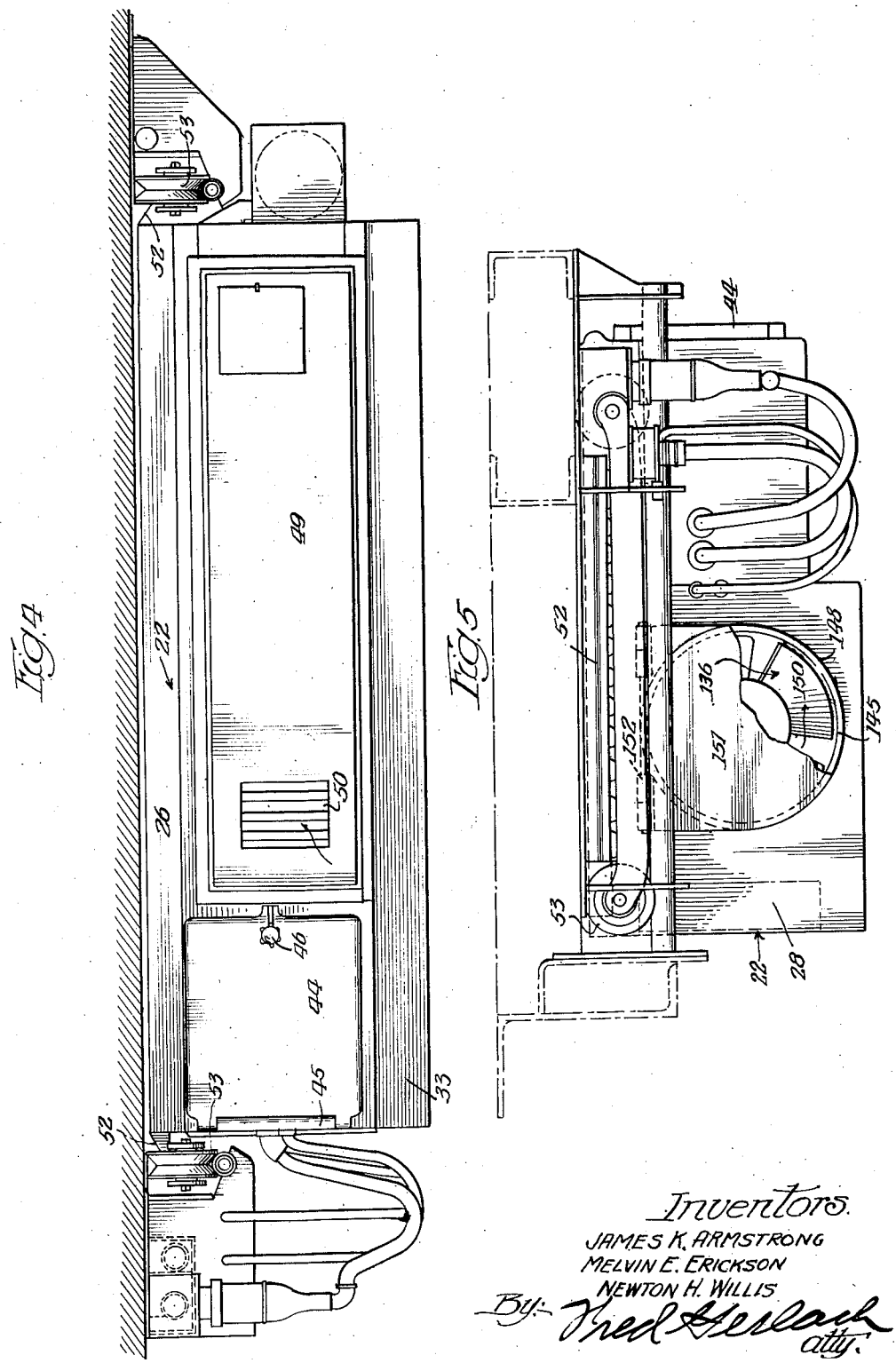

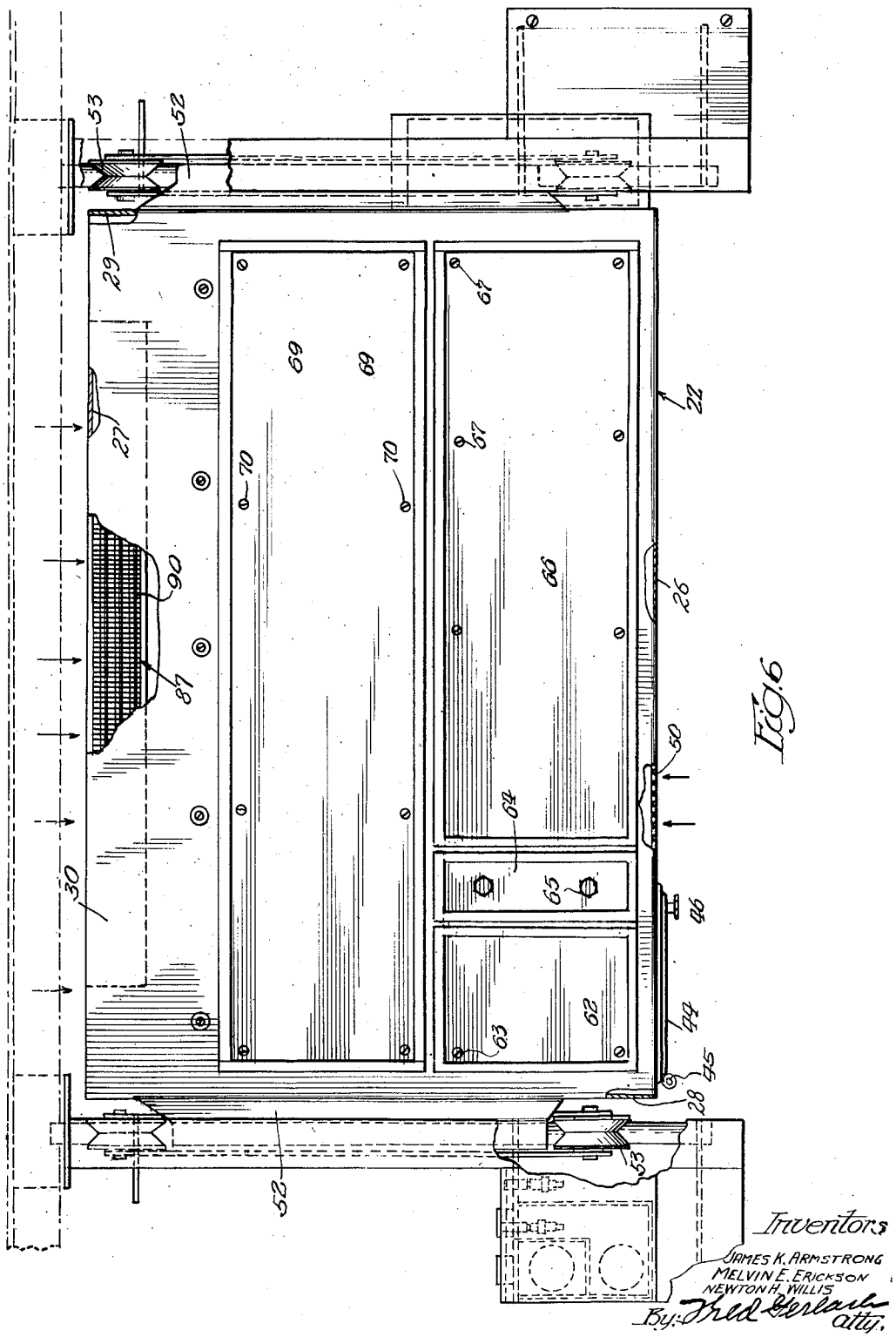

July 16, 1957
J. K. ARMSTRONG ET AL
2,799,782
ENGINE-GENERATOR UNIT
Filed Jan. 4, 1956
14 Sheets-Sheet 5
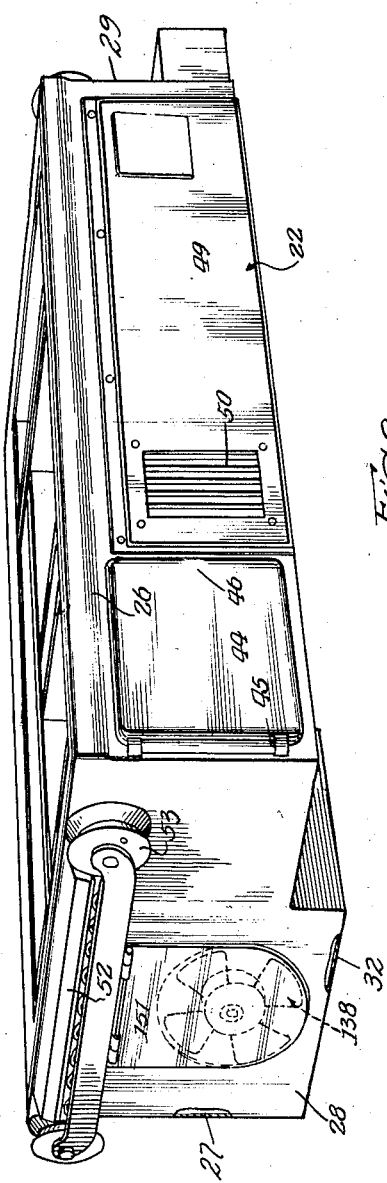
Inventors
JAMES K. ARMSTRONG
MELVIN E. ERICKSON
NEWTON H. WILLIS
By:

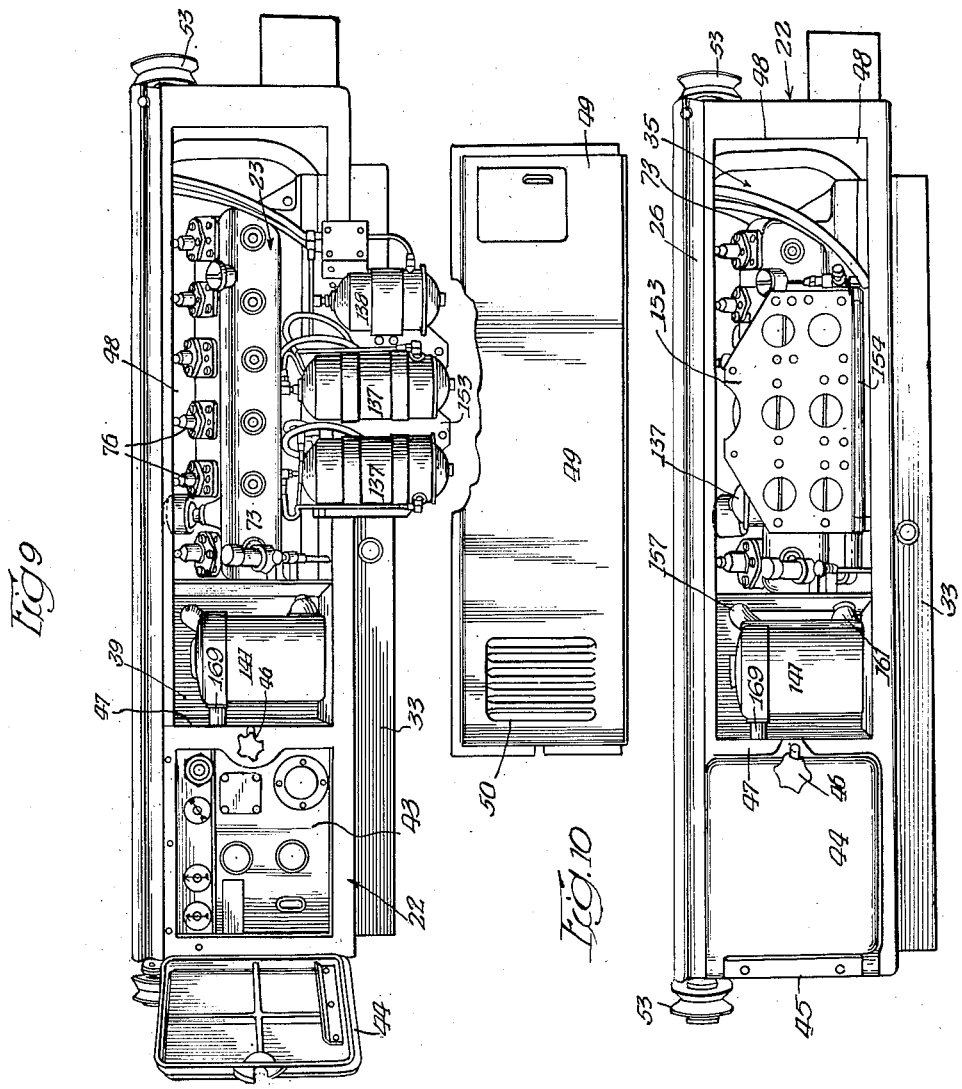

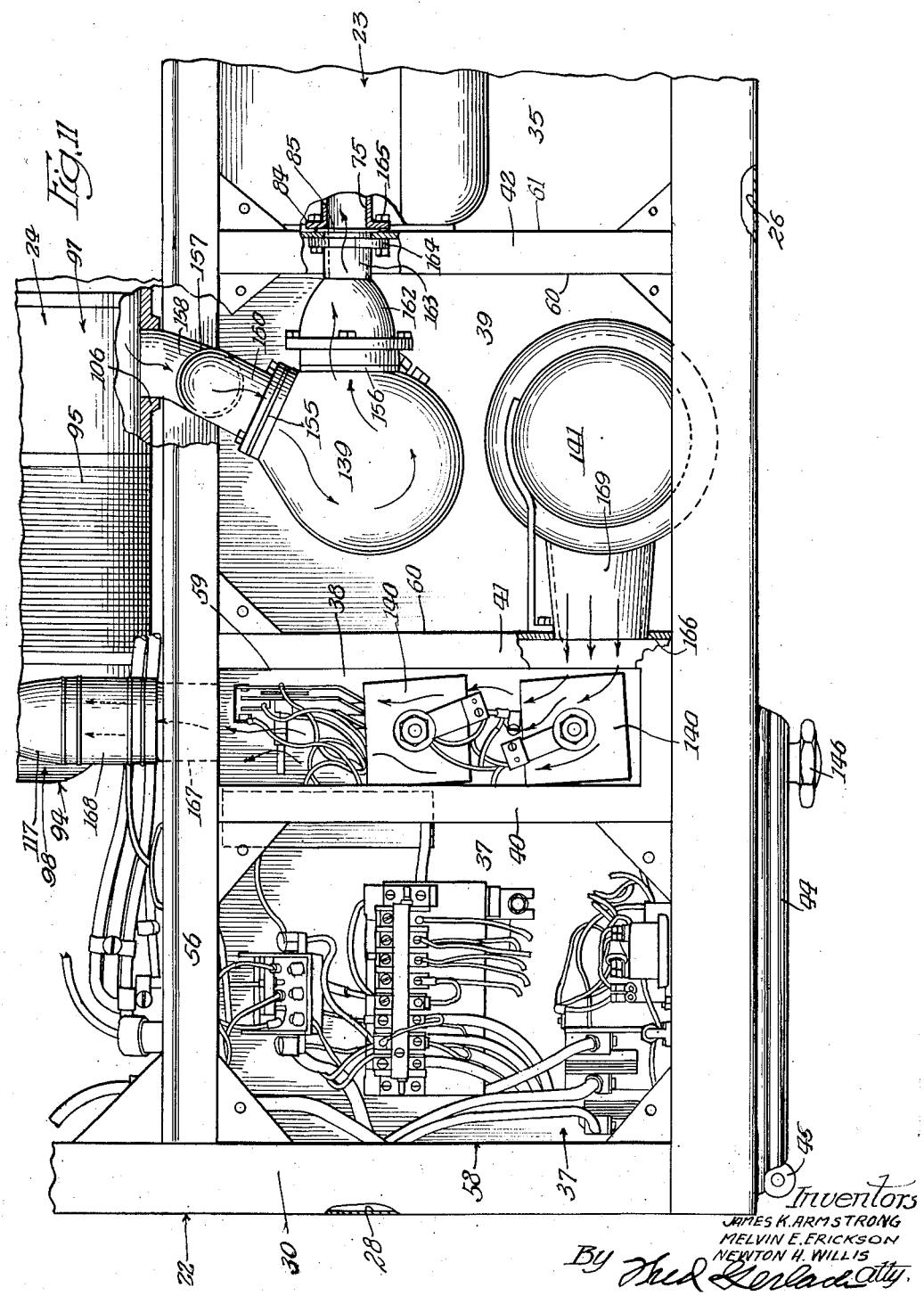

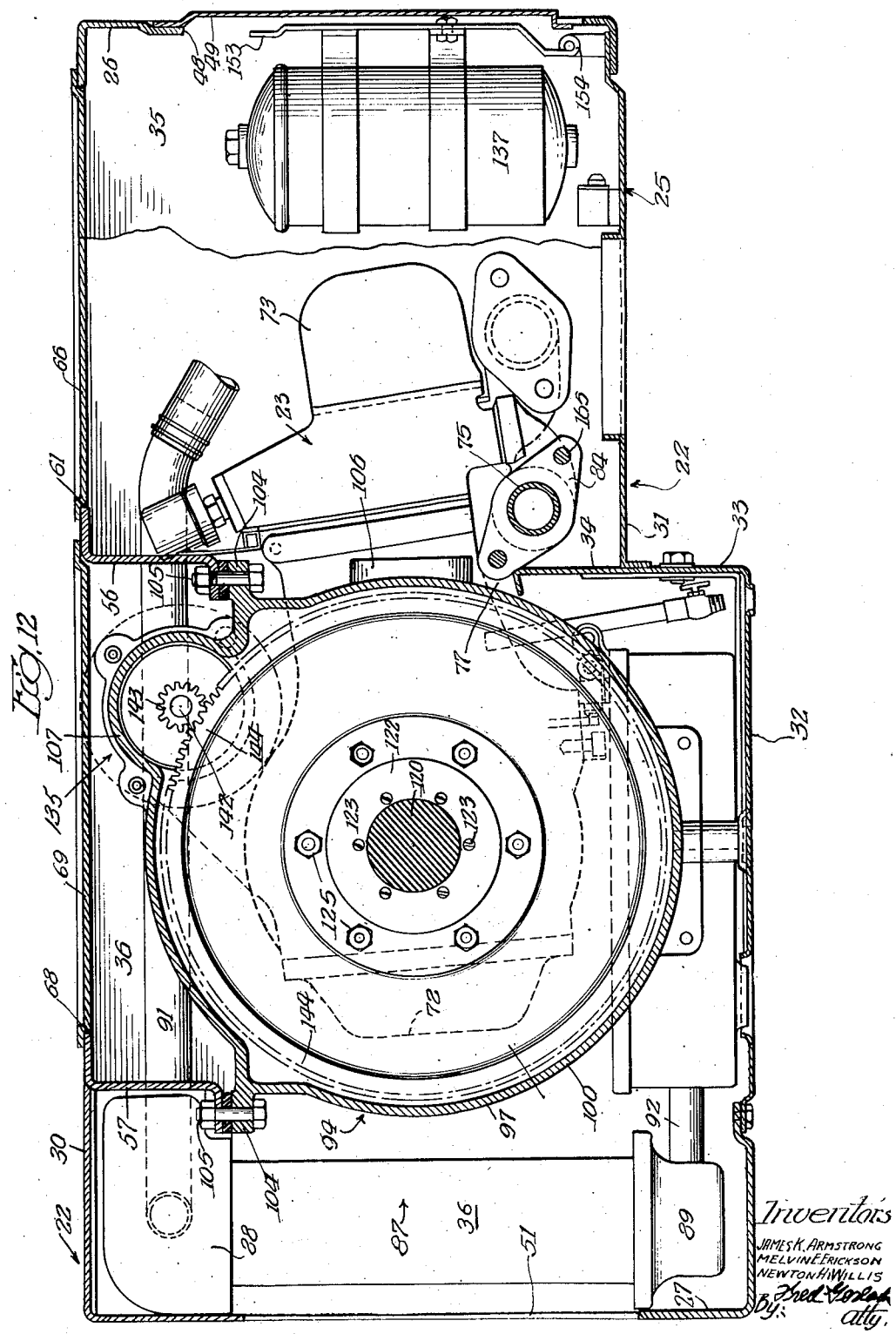

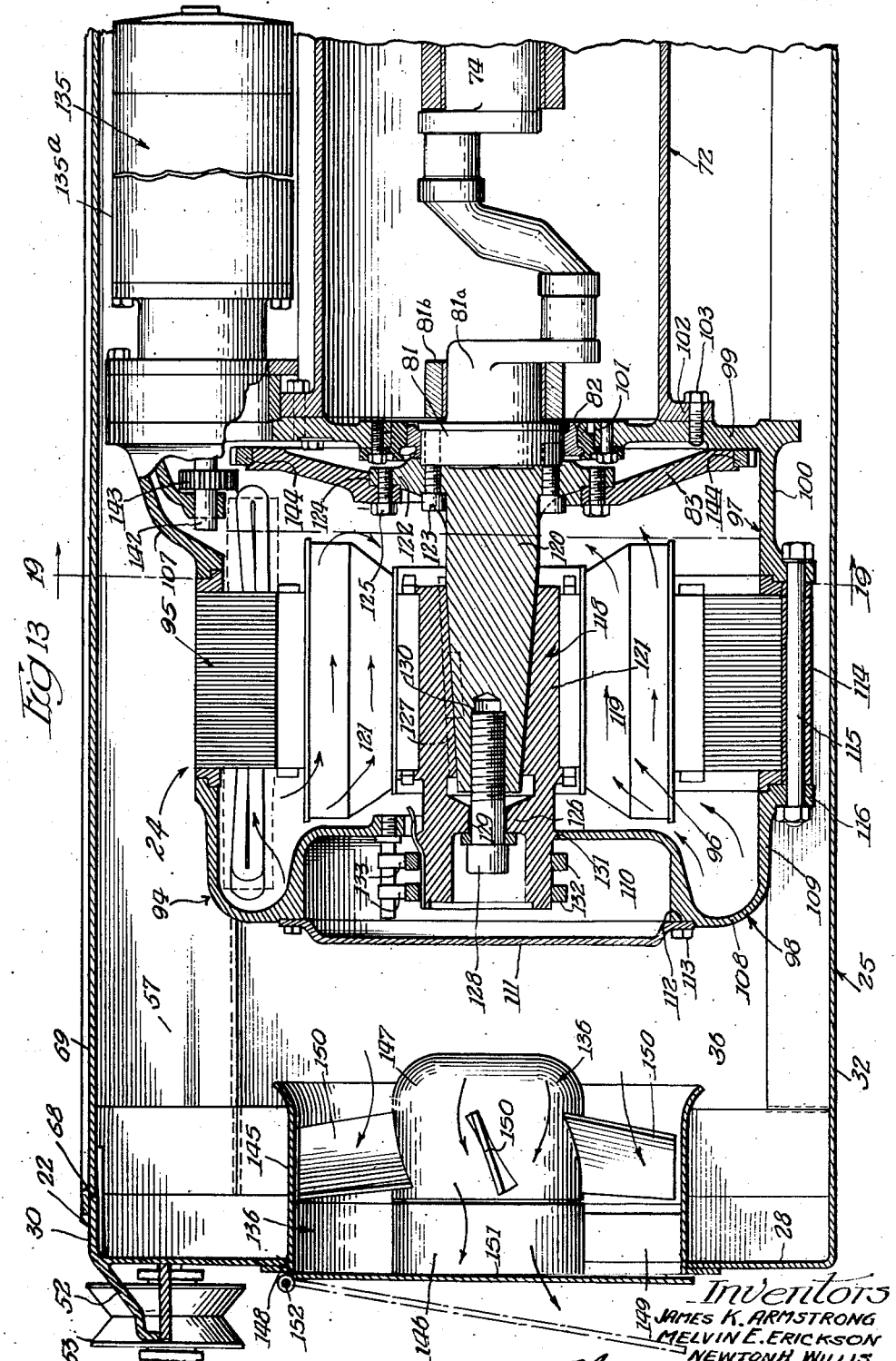

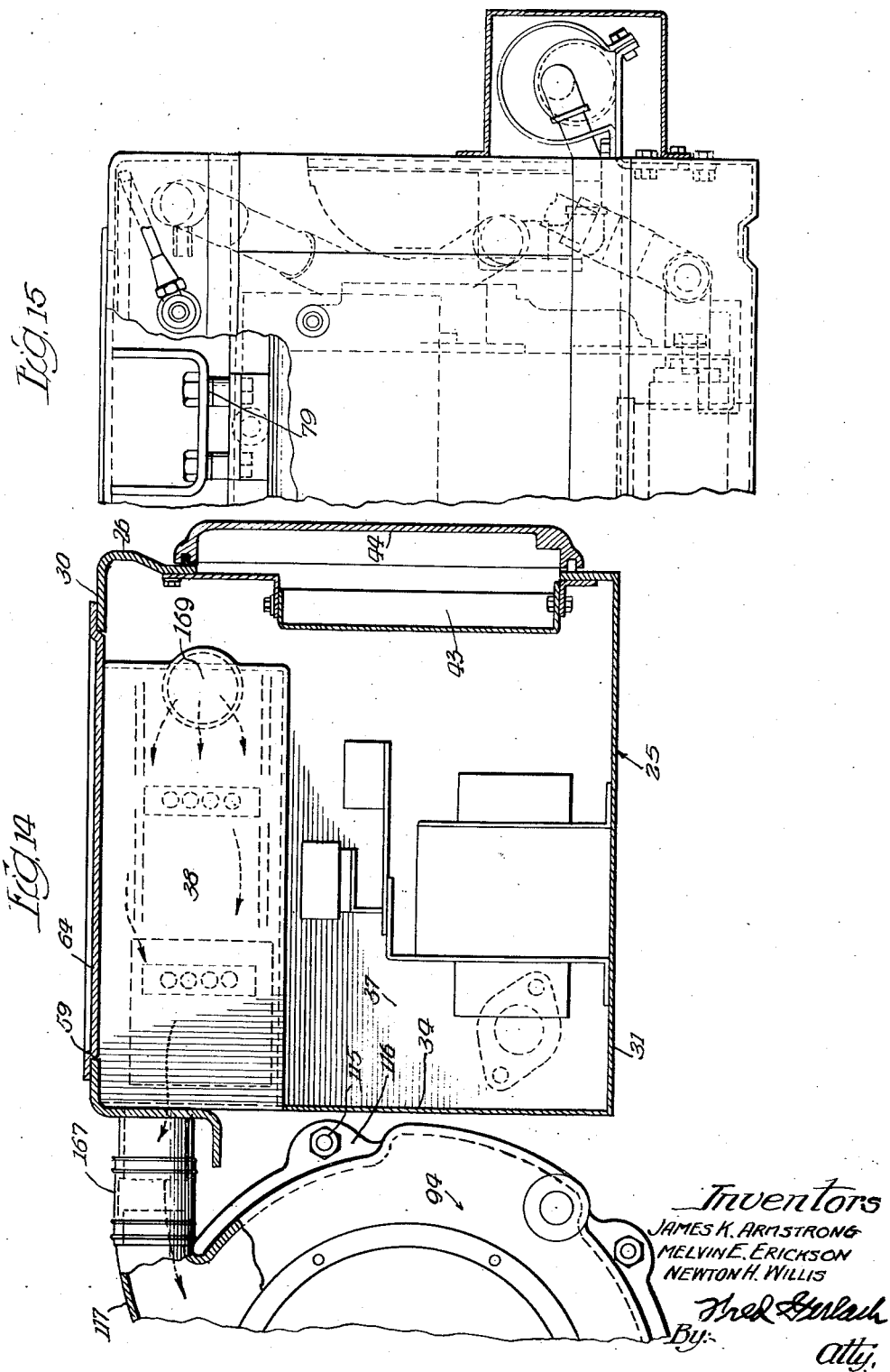

July 16, 1957  J. K. ARMSTRONG ET AL  2,799,782
ENGINE-GENERATOR UNIT
Filed Jan. 4, 1956  14 Sheets-Sheet 11
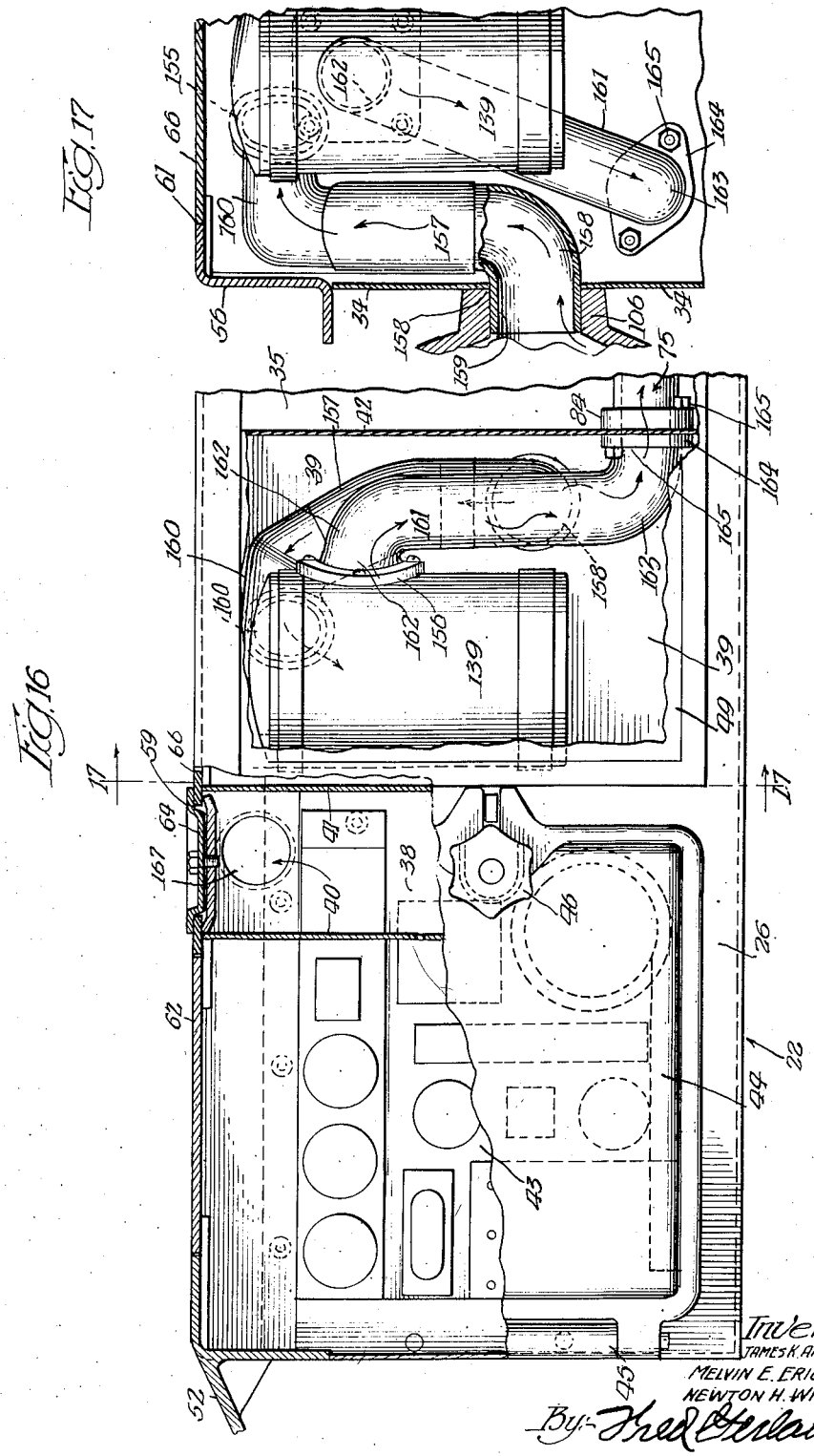

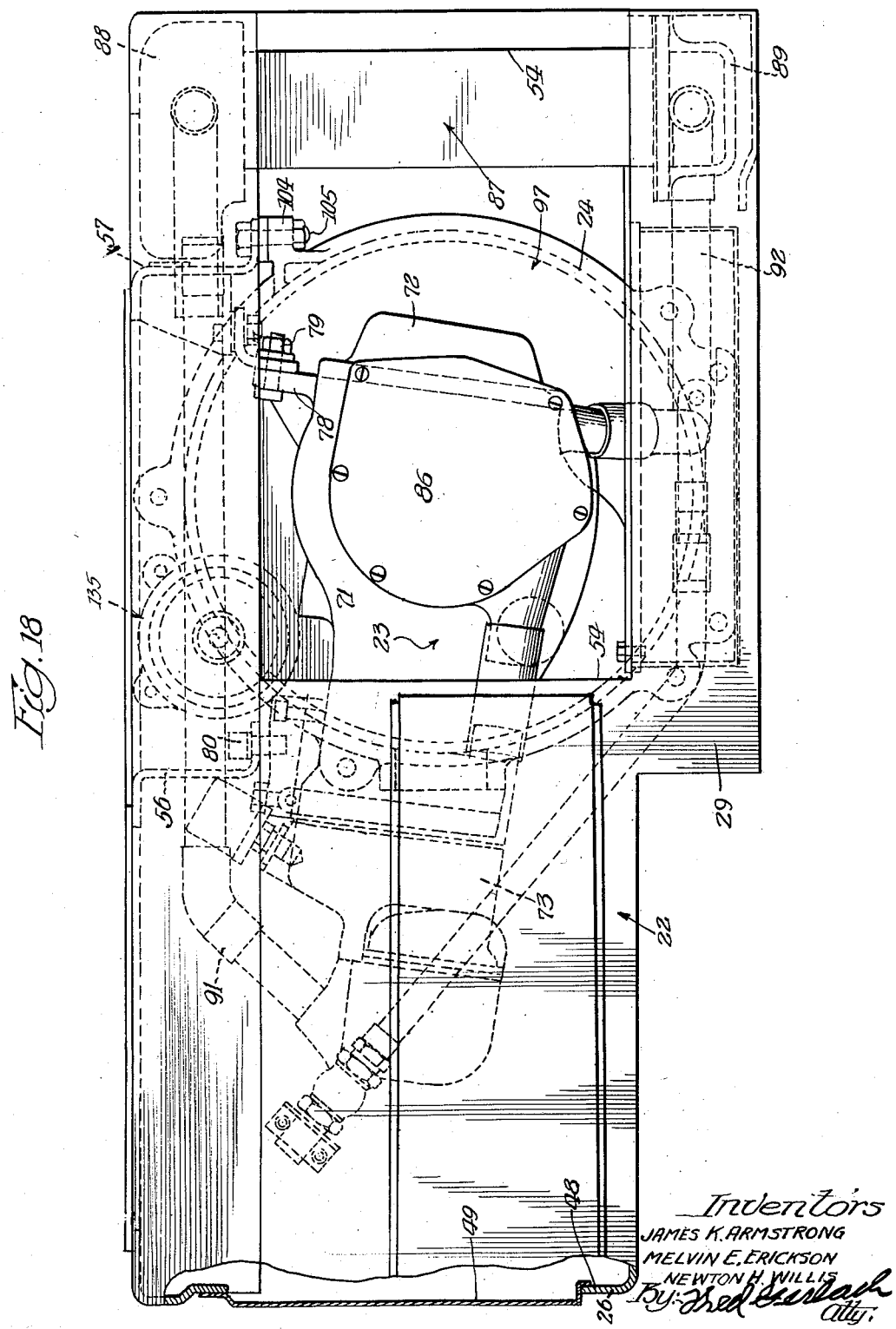

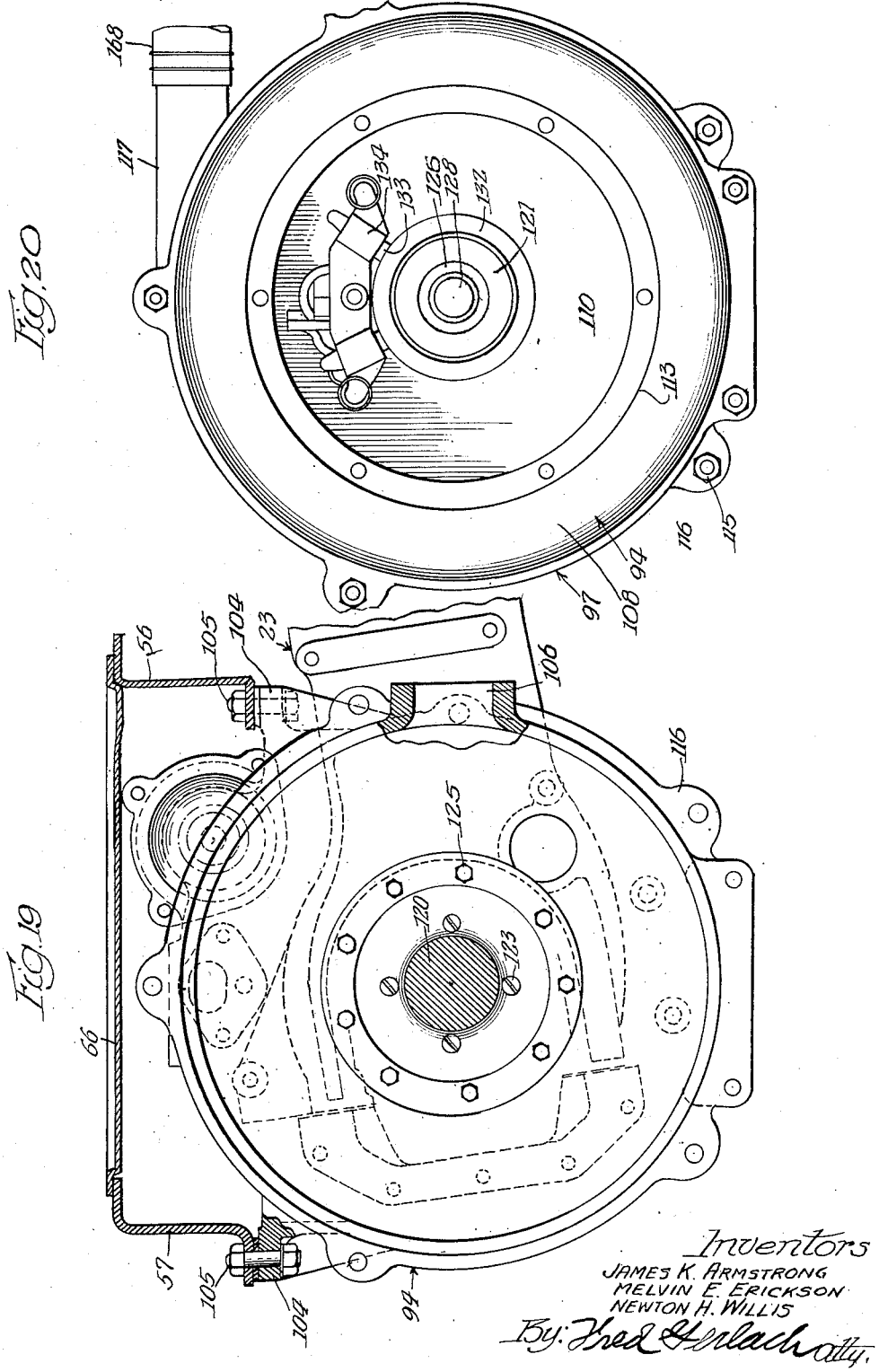

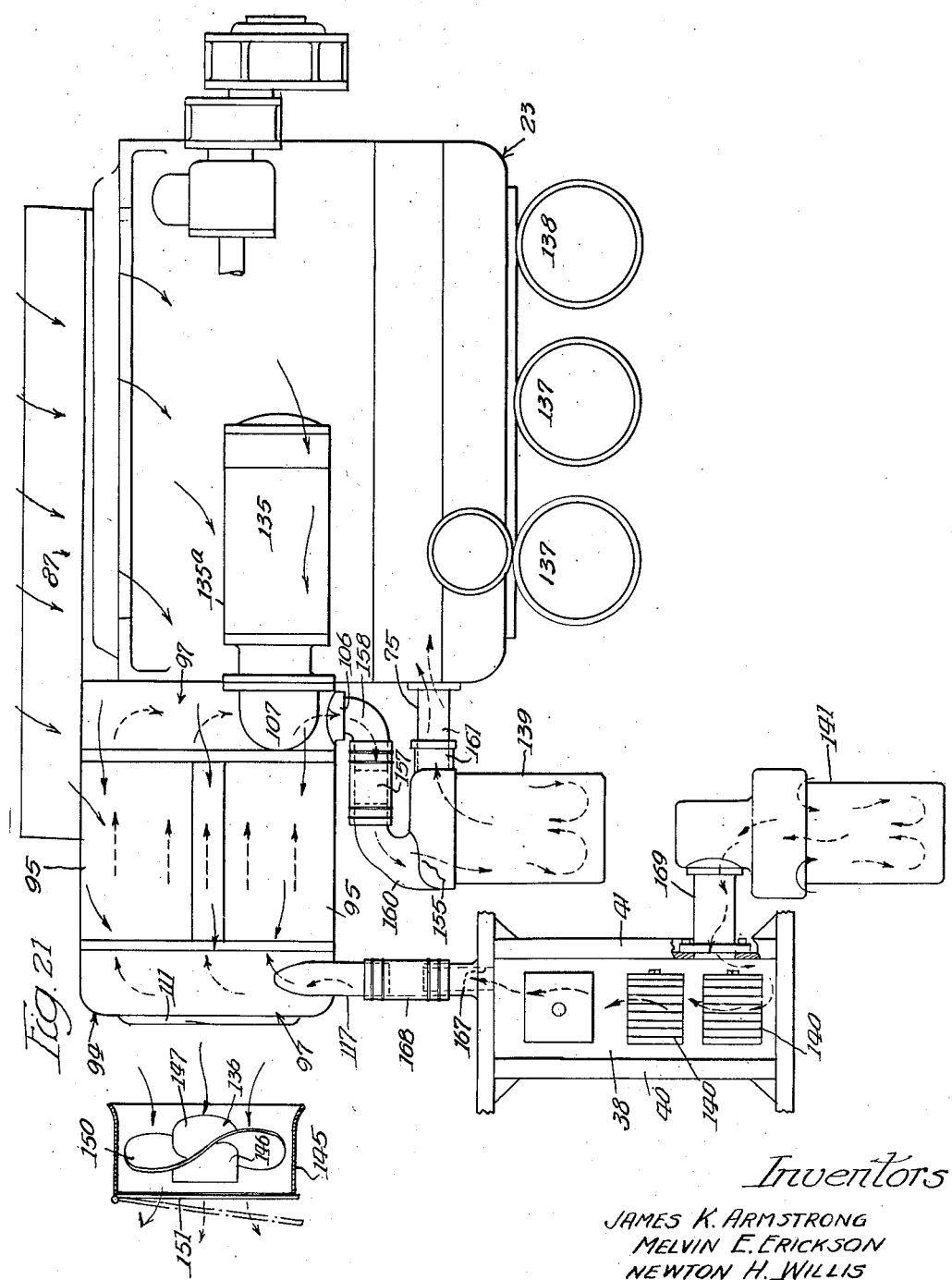

United States Patent Office 2,799,782
Patented July 16, 1957

2,799,782
ENGINE-GENERATOR UNIT

James K. Armstrong, Waukesha, Melvin E. Erickson, Hales Corners, and Newton H. Willis, Waukesha, Wis., assignors to Waukesha Motor Company, Waukesha, Wis., a corporation of Wisconsin Application January 4, 1956, Serial No. 557,397

10 Claims. (Cl. 290—1)

The present invention relates generally to engine-generator units. More particularly, the invention relates to that type of engine-generator unit which is designed primarily for use in connection with a railroad car, serves when in operation to charge the battery and supply electric current to the electrical appliances for the car, and as its principal components or parts comprises: (1) a horizontally elongated box-like housing which is normally positioned under and lengthwise of the bottom of the car body and consists of a bottom wall, outer and inner side walls, end walls and a top wall; (2) an internal combustion engine which is mounted in one end portion of the housing interior and embodies a piston driven crank shaft; and (3) an electric generator which is mounted in the other end portion of the housing interior, is positioned in longitudinal alignment with the engine, consists of a shell, a stator and a rotor, and has the rotor thereof connected for drive by the crank shaft of the engine.

One object of the invention is to provide an engine-generator unit which is an improvement on, and has certain inherent advantages over, previously designed units of the aforementioned type and is characterized by a simple, novel and compact arrangement of parts and high efficiency.

Another object of the invention is to provide an engine-generator unit in which the shell of the generator has an inlet and an outlet whereby air may be circulated through it in order to effect cooling of the stator and rotor, and the outlet is connected by a conduit to the intake manifold of the engine to the end that when the engine is in operation the suction that is created in the intake manifold causes automatically the circulation of air through the generator shell to effect the desired cooling of the operating parts of the generator, i. e., the stator and rotor.

Another object of the invention is to provide an engine-generator unit of the type and character last mentioned and in which the generator is of the alternating current variety and has associated with it rectifiers for furnishing direct current for excitation of the generator and also rectifiers for furnishing direct current for battery charging purposes, the box-like housing has a separate compartment for the rectifiers, and such compartment has an air inlet and in addition an air outlet which is connected to the air inlet of the generator shell to the end that the cooling air for the generator is caused before flowing through the shell to flow through the aforementioned compartment and effect cooling of the rectifiers.

Another object of the invention is to provide an engine-generator unit of the last mentioned character and in which the air inlet for the compartment in which the rectifiers for the generator are mounted is connected to an air pre-cleaner having an inlet in communication with the exterior of the box-like housing, and the conduit between the outlet of the shell of the generator and the intake manifold of the internal combustion engine includes an oil bath variety filter in order that the air which is drawn into the intake manifold after successively flowing through the pre-cleaner, the compartment for the rectifiers and the shell of the generator is rid of dust or other foreign particles which might have an injurious effect upon the operating parts of the engine.

Another object of the invention is to provide an engine-generator unit of the type and character last mentioned and in which the box-like housing is so designed that it embodies adjacent to the compartment for the rectifiers a compartment in which the pre-cleaner and the oil bath variety filter are mounted.

Another object of the invention is to provide an engine-generator unit of the type under consideration and in which the shell of the generator is of composite character and embodies an outer end part which is shaped and constructed to form a closed chamber in isolated relation with the shell interior, and the rotor of the generator embodies a shaft one end of which extends into the chamber and has associated therewith collector rings and brushes which because they are disposed in the chamber are not subject to have deposited therein any dust or other foreign particles in the air that is circulated through the shell interior for the purpose of cooling the stator and rotor of the generator.

Another object of the invention is to provide an engine-generator unit of the aforementioned type and character and in which the internal combustion engine is of the water cooled type and embodies a finned tube variety radiator, such radiator is located directly inwards of an opening in the inner side wall of the box-like housing, and such housing has associated with it an electric fan which is positioned adjacent to an opening in the housing end wall that is directly outwards of the generator, and operates when driven to cause outside air to flow successively into the housing interior via the aforementioned opening in the inner side wall of the housing, then past the radiator for radiator cooling purposes, then around and past the generator and finally back to the exterior of the housing via the opening in the housing end wall that is directly outwards of the generator.

A further object of the invention is to provide an engine-generator unit of the type and character under consideration in which the box-like housing embodies in its outer side wall a horizontally elongated access opening with a removable cover plate therefor, the internal combustion engine is of the diesel type and has as accessories therefor lubricating and fuel oil filters, and such filters are mounted on a panel which is normally disposed in an upright position directly inwards of the aforesaid access opening in the outer side wall of the housing and has the bottom margin thereof provided with hinges whereby when the cover plate for the access opening is removed the panel may be swung outwards and downwards through the access opening into a position wherein the filters are disposed exteriorly of the housing and are readily accessible for inspection or repair purposes.

A still further object of the invention is to provide an engine-generator unit which is generally of new and improved construction and due to its particular design, construction and arrangement of parts, effectively and efficiently fulfills its intended purpose.

Other objects of the invention and the various advantages and characteristics of the present engine-generator unit will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 1 is a perspective view of a refrigerator variety freight car having mounted under the bottom of its body an engine-generator unit embodying the invention;

Figure 2 is an end view looking in the direction of the end portion of the box-like housing in which the internal combustion engine is mounted, and showing in detail parts of the roller and track means whereby the unit is mounted so that it is shiftable back and forth between an operating position wherein it is disposed completely under the car body and an inspection position wherein it is disposed outwards of one side of the body of the car;

Figure 3 is a plan view of the engine-generator unit showing the top wall of the housing with the cover plate for one of the access openings therein removed and illustrating in a fragmentary manner the cover plate for another of the access openings in the housing top wall;

Figure 4 is a side elevation of the unit looking towards the outer side wall;

Figure 5 is an end view looking in the direction of the housing end wall that is directly outwards of the generator;

Figure 6 is a plan view of the unit, a portion of the top wall of the box-like housing being broken away in order to show the arrangement and design of the finned tube variety radiator for the internal combustion engine;

Figure 7 is a front perspective view of the unit;

Figure 8 is a rear perspective view of the unit, certain parts being omitted and other parts being shown in broken away fashion for illustrative purposes;

Figure 9 is a front side elevation showing the cover plate for the horizontally elongated access opening in the outer side removed from its normal position, and illustrating the hinged panel for the lubricating and fuel oil filters after it has been swung outwards and downwards into its inspection position wherein it is disposed exteriorly of the housing and permits of ready access to the filters;

Figure 10 is a view somewhat similar to Figure 9 except that it shows the panel on which the hinged panel is mounted after it has been swung back into its normal position;

Figure 11 is an enlarged fragmentary plan view of the portion of the box-like housing that has the compartment for the rectifiers for generator excitation and the rectifiers for battery charging and the compartment for the pre-cleaner and the oil bath variety filter in the conduit between the air outlet of the shell of the generator and the intake manifold of the internal combustion engine, the cover plates for the access openings that lead to said compartments being omitted for illustrative purposes;

Figure 12 is an enlarged vertical transverse section taken on the line 12—12 of Figure 3 and illustrating the manner in which the internal combustion engine is positioned and also the manner of mounting of the generator;

Figure 13 is a vertical longitudinal section taken on the line 13—13 of Figure 3 and illustrating the construction and design of the generator and showing the arrangement of the electric suction type fan for circulating outside air through the radiator for the engine and over the external surfaces of the generator for heat absorbing purposes;

Figure 14 is an enlarged vertical transverse section taken on the line 14—14 of Figure 3 and showing the manner in which the air inlet of the generator shell is connected to the compartment for the rectifier in such manner that air for cooling purposes is caused to flow through such compartment before it is drawn through the generator shell;

Figure 15 is a fragmentary front view of the right hand end of the housing, certain parts being broken away in order to illustrate certain mounting parts for the internal combustion engine;

Figure 16 is a fragmentary front view of the left hand end of the housing, certain parts being broken away and other parts being shown in section;

Figure 17 is a vertical transverse section taken on the line 17—17 of Figure 16 and illustrating in detail the manner in which the oil bath variety filter is connected to the air outlet of the generator shell and the intake manifold of the engine;

Figure 18 is an end elevation of the end of the housing in which the engine is mounted, the cover plate for the access opening in the housing end wall that is directly outwards of the engine being removed so as to illustrate the manner in which the crank case of the engine is positioned and supported in the housing;

Figure 19 is a vertical transverse section taken on the line 19—19 of Figure 13;

Figure 20 is an end elevation of the outer end of the generator, certain parts being removed in order to show the mounting of the collector rings and brushes in the compartment which is formed in the outer end part of the generator shell and is isolated or separate from the shell interior wherein the stator of the generator is disposed; and Figure 21 is a diagrammatic view showing by dotted arrows the travel of the generator cooling air and by full line arrows the travel or flow of the air for effecting cooling of the radiator for the engine.

Referring now to the drawings in detail and in particular to Figures 1 and 2, the engine-generator unit which is shown in the drawings constitutes the preferred form or embodiment of the invention. It is illustrated as being mounted under the bottom of the body of a standard or conventional railroad refrigerator car having in certain of the roof hatches thereof self-contained air conditioning units of the type that forms the subject matter of co-pending United States patent application Serial No. 493,172, filed on March 9, 1955, by Melvin E. Erickson, Robert D. Kern and Newton H. Willis, owned by Waukesha Motor Company of Waukesha, Wisconsin, and entitled "Self-Contained Air Conditioning Apparatus For Use in the Roof Hatch of a Railway Refrigerator Car or the Like." The purpose of the engine-generator unit is to supply direct electric current to the various electric motors of the air conditioning units and also the battery and other electrical appliances with which the car may be equipped. The unit as shown in the drawings is horizontally elongated. It is positioned so that it extends lengthwise of the railroad refrigerator car and has associated therewith roller and track means whereby it may be shifted back and forth between a regular operating position wherein it is disposed under the bottom of the body of the car and an inspection position wherein it is disposed outwards of one side of the car as shown by dotted lines in Figure 2. For a disclosure of suitable roller and track means for supporting the engine-generator unit, reference may be had to co-pending United States patent application Serial No. 626,694, filed on December 6, 1956 by Newton H. Willis et al., and owned by said Waukesha Motor Company. As its principal parts or components the unit comprises a horizontally elongated box-like housing 22, an internal combustion engine 23 (Figure 3), a generator 24 (see also Figures 11 and 13), and certain hereinafter described accessories for the generator and the engine.

Housing

As best seen in Figures 2, 3, 6 and 7, the box-like housing 22 of the unit is fabricated from steel angle bars and other pieces and steel plates all of which are welded or otherwise fixedly secured together in such manner that the housing is rigid and consists of a bottom wall 25, an outer side wall 26, an inner side wall 27, a pair of end walls 28 and 29 and a top wall 30.

The bottom wall 25 of the housing is stepped in a crosswise direction (see Figures 2, 7, 12 and 18) and consists of an elevated outer part 31, a lower inner part 32 and a vertically extending part 33 between the inner side marginal portion of the outer part 31 and the inner side marginal portion of the inner part 32. The upper portion of the vertically extending part 33 of the housing bottom wall 25 is provided with an integral extension which extends towards the housing top wall 30 and forms a partition 34 (Figure 12) whereby the interior of the housing is divided into a longitudinally extending outer space 35 and an adjacent longitudinally extending inner space 36. The left hand end portion of the outer space 35 as viewed in Figures 3 and 11 is divided into three compartments 37, 38 and 39 by three upstanding spaced apart transversely extending partitions 40, 41 and 42. Such partitions extend upwards from the elevated outer part 31 of the housing bottom wall 25 to the superjacent portions of the top wall 30 and have the front or outer vertically extending marginal portions thereof suitably secured to the outer side wall 26. The vertically extending inner rear marginal portions of the three partitions 40, 41 and 42 are suitably secured to the adjacent portions of the vertical longitudinally extending partition 34.

The portion of the housing outer side wall 26 that is in front of the compartment 37 is so constructed or designed as to form an open front inwardly recessed box 43 for controlling and indicating devices (see Figure 9) for the unit. The open front of the box 43 is normally closed by a horizontally elongated door 44 (see also Figures 6, 11 and 16) which has at one end thereof a hinge 45 whereby it may be swung back and forth between open and closed positions. The other end portion of the door has associated with it a latch 46 for releasably securing the door in its closed position. The latch which is shown in the drawing consists of a nut-equipped eye bolt which is pivotally connected to the outer side wall 26 of the housing and is adapted to fit within a notch in the central portion of the distal end of the door. The housing front wall 26 is provided with an access opening 47 and an access opening 48 (Figure 4). The access opening 47 leads to the front of the compartment 39 and the access opening 48 leads to the right hand end portion of the outer space 35. The two access openings 47 and 48 are normally closed by a rectangular horizontally extending cover plate 49 (Figures 1, 7 and 9). The latter is provided with screws or other attaching devices (not shown) for releasably securing it in its closed position, and has in its left hand end portion a grille-equipped opening 50 which establishes communication between the compartment 39 and the air or atmosphere around the housing, i. e., the ambient air.

The inner side wall 27 is disposed in parallel relation with the front side wall 26 and has a rectangular horizontally extending opening 51 (Figure 12), which establishes communication between the inner space 36 and the housing exterior.

The end walls 28 and 29 of the box-like housing 22 extend vertically and are arranged in parallel relation. They serve as end closures for the outer and inner spaces 35 and 36 and are provided on their upper margins with horizontally elongated exteriorly disposed brackets 52 (Figures 2, 5 and 6). The end portions of the two brackets are provided with rollers 53 which constitute parts of the aforementioned roller and track means whereby the engine-generator unit as a whole is mounted under the bottom of the car body so it is capable of being shifted back and forth between a normal operating position and an inspection position. The end wall 29 embodies in the rear portion thereof a rectangular horizontally extending access opening 54 (Figure 18) which is normally closed by a cover plate 55. The latter is provided with screws or other attaching devices (not shown) for releasably securing it in its closed position wherein it covers the access opening 54.

The top wall 30 is of composite character and includes inner and outer Z-bars 56 and 57 as best shown in Figure 12 of the drawings. These Z-bars are arranged in spaced apart and parallel relation and extend lengthwise of the housing. The Z-bar 56 is vertically aligned with, and forms in effect an upper continuation of, the partition 34. The other Z-bar, i. e., the Z-bar 57, is spaced a small distance inwards of the upper portion of the rear side wall 27 of the housing. The outer or front portion of the top wall 30 is constructed or designed to provide access openings 58, 59, 60 and 61 (Figure 11). The access opening 58 leads to, and communicates with, the top of the compartment 37 and is normally closed by a cover plate 62 which as shown in Figures 3 and 6 is removably secured in place by screws 63. The access opening 59 leads to, and communicates with, the top of the compartment 38 and is normally closed by a cover plate 64 which is removably secured in place by means of bolts 65 (see Figures 3 and 6). The access opening 60 leads to, and communicates with, the top of the compartment 39, and the access opening 61 leads to, and communicates with, the top of the right hand end portion of the front space 35. The two last mentioned access openings, i. e., the openings 60 and 61, are normally closed by a single rectangular cover plate 66 which as shown in Figure 6 is removably secured in place by screws 67. The central portion of the top wall 30 of the box-like housing 22 is provided with a rectangular longitudinally extending access opening 68 which as shown in Figure 3 leads to, and communicates with, the inner space 36 and is normally closed by a cover plate 69 (Figure 6). The latter is provided with screws 70 for releasably securing it in its closed position wherein it completely covers the access opening 68.

Internal Combustion Engine

Referring now to Figures 9, 13 and 18, the internal combustion engine 23 is illustrated in the drawings as being of the diesel type although it is to be understood, of course, that it may be any other type of internal combustion engine, such, for example, as one which utilizes a carburetor and employs gasoline as the fuel therefor. It is of the straight line multi-cylinder type and consists of a cylinder block 71, a crank case 72, a valve-equipped cylinder head 73, a crank shaft 74, an air intake manifold 75 and fuel injectors 76. As best shown in Figures 12 and 18, the engine 23 is positioned in a sidewise manner as contradistinguished from vertically. It is disposed wholly within the housing 22 and is arranged so that the crank shaft 74 thereof extends lengthwise of the housing interior. The central portion of the cylinder block 72 extends through an opening 77 in the right hand end portion of the extension-formed upstanding partition 34 and is arranged so that the crank case 72 is disposed in the right hand end portion of the inner space 36 and the cylinder head 72 is disposed in the right hand end portion of the outer space 35. The portion of the engine cylinder block 71 that is adjacent to the crank case 72 is provided with a fixed upwardly extending lug 78 which is connected by a bolt and bracket arrangement 79 to the web of the Z-bar 57 as shown in Figures 15 and 18. The portion of the cylinder block that is adjacent to the cylinder head 73 is secured to the lower flange of the Z-bar 56 by a bolt 80 (see Figure 18). The bolt and bracket arrangement 79 and the bolt 80 serve to hold the engine in a fixed position within the box-like housing 22. The cylinder block 71 is provided with a longitudinal series of spaced apart cylinders (not shown). Pistons (also not shown) are slidably mounted in the cylinders and are operatively connected to the cranks of the crank shaft 74 by connecting rods (not shown). The crank shaft 74 extends lengthwise through the crank case 72 and has the end thereof that is nearer the housing end wall 28 provided with an integral flange 81 (Figure 13) and an end bearing journal 81a directly inwards of the flange. The journal is mounted rotatably in an end bearing 81b and the flange 81 is surrounded by an oil seal 82 and is indirectly connected to a fly wheel 83 (see Figure 13). As shown in Figure 12, the air intake manifold 75 is located in, and extends lengthwise of, the right hand end portion of the outer space 35 as viewed in this figure and underlies the cylinder head 73. It serves to conduct air into the cylinders during the suction strokes of the pistons and embodies on the end thereof that is farther from the housing end wall 29 an integral outwardly extending flange 84. The latter abuts against the lower portion of the upstanding transversely extending partition 42. The portion of the partition against which the flange 84 abuts has a hole 85 therein. Such hole is best shown in Figure 11 of the drawings and registers and communicates with the adjacent end of the air intake manifold 75. The fuel injectors 76 (Figure 9) correspond in number to, and are associated respectively with, the cylinders in the cylinder block 71 and serve to inject fuel oil under pressure into the cylinders at the ends of the compression strokes of the pistons.

The internal combustion engine 23 of the unit is of the water cooled variety and embodies in addition to the parts heretofore mentioned a rotary pump 86 (Figure 3) and a radiator 87 (Figures 8, 12 and 18). The cylinder block and cylinder head of the engine are water jacketed in any conventional or standard manner. The pump 86 is suitably mounted on the end of the engine crank case that is adjacent to the housing end wall 29 and is accessible by way of the access opening 54 after removal of the cover plate 55. The rotor of the pump is suitably connected for drive by the engine crank shaft 74. The radiator 87 is shaped conformably to the rectangular horizontally extending opening 51 in the inner side wall 27 of the housing. It is located directly inwards of said opening and consists of an upper header 88 (Figure 12), a lower header 89 and fin-equipped tubing 90 (Figures 6 and 8) between the two headers. The upper header 88 of the radiator is connected to the water jacket in the cylinder head 73 by way of a pipe and hose connection 91, and the lower header 89 is connected to one side of the centrifugal pump 86 by a pipe and hose connection 92. When the pump 86 is driven as the result of operation of the engine, it functions to circulate water or other cooling liquid successively through the water jackets in the cylinder block and cylinder head and the radiator 87. In connection with flow of the liquid type coolant through the finned tubing of the radiator, the heat which is picked up during flow of the coolant through the aforementioned water jackets is dissipated, i. e., it is absorbed by the hereinafter described air that flows past the radiator.

The fuel injectors 76 of the engine are supplied with fuel from a storage tank 93 which as shown in Figure 1 is mounted under the bottom of the car body at a location in close proximity to the engine-generator unit.

*Generator*

Referring now to Figures 3, 11 and 12, and particularly to the latter, the generator 24 is preferably of the type that creates or produces alternating electric current. It is disposed in longitudinal alignment with the Diesel variety internal combustion engine 23 and is located in the left hand end portion of the inner space 36 as viewed in Figure 3. As its components or parts the generator comprises a shell 94, a stator 95 and a rotor 96. The shell 94 is of composite character and consists of two complemental oppositely positioned cup-shaped shell parts 97 and 98 (Figure 11). The cup-shaped part 97 is located at the inner end of the generator and abuts against the adjacent end of the crank case 72 of the engine. It is preferably in the form of a metallic casting and consists of a vertically extending substantially circular end wall 99 and a continuous side wall 100. The central portion of the end wall 99 is provided with a circular aperture 101 in which is seated the oil seal 82 around the crank shaft flange 81. The portion of the end wall 99 that is intermediate the outer and inner marginal portions fits against an integral outwardly extending flange 102 on the adjacent end of the engine crank case 72 and is fixedly secured thereto by way of bolts 103.

Still referring to Figure 13, the continuous side wall 100 of the shell 94 is formed integrally with the outer marginal portion of the end wall 99 and extends in the direction of the housing end wall 28. It surrounds the fly wheel 83 and embodies on the upper portion thereof a pair of integral outwardly extending lugs 104 (Figure 12). The latter underlie the lower flanges of the two Z-bars 56 and 57 and are fixedly secured thereto by way of vertically extending bolts 105. Said bolts serve to hold the generator and engine in a fixed position within the inner space 36 in the boxlike housing 22. The side portion of the side wall 100 that is nearer the outer side wall 26 of the housing is provided with a tubular integral outwardly extending air outlet member 106. The latter is in communication with the interior of the generator shell and forms a part of a system or arrangement for circulating cooling air past the stator and rotor of the generator. The upper portion of the side wall 100 of the shell part 97 is shaped to form an integral enlarged open ended hood-like member 107 the purpose of which will be described hereafter. The cup-shaped part 98 of the shell is oppositely positioned with respect to, and is spaced a small distance away from, the cup-shaped part 97. It is in the form of a metallic casting and consists of a vertically extending circular end wall 108 (Figures 13, 19 and 20) and a continuous side wall 109. The central portion of the end wall 108 is inwardly offset with respect to the outer marginal portion of said end wall in order to form a cylindrical open front chamber 110. Such chamber is isolated or separate from the interior of the generator shell and has its open front closed by a disc-like cover plate 111. The marginal portion of the cover plate 111 fits within an annular outwardly facing recess 112 in the outer marginal portion of the end wall 108 and is removably secured in place by bolts 113. The continuous side wall 109 of the outer cup-shaped part 98 of the generator shell is formed integrally with the outer marginal part of the end wall 108 and extends inwards, i. e., towards the continuous side wall 100 of the inner cup-shaped part 97. The two cup-shaped parts are held in spaced apart relation by way of horizontally extending spacer sleeves 114 and are connected together by horizontally extending bolts 115. The sleeves 114 extend between integral outwardly extending centrally apertured lugs 116 on the free marginal portions of the side walls of the two cup-shaped parts. The bolts 115 extend through the spacer sleeves 114 and also through the apertures in the lugs 116. The top portion of the continuous side wall 109 of the outer cup-shaped part 98 of the shell is provided with an integral tangentially disposed outwardly extending air inlet member 117 as best shown in Figures 3, 11 and 14. Such member faces in the direction of the compartment 38 and coacts with the outlet member 106 to permit air to circulate through the shell interior for the purpose of cooling the generator stator and rotor when the generator is in operation.

The stator 96 of the rotor is annular and is disposed and clamped between the continuous side walls of the complemental cup-shaped parts 97 and 98 of the shell 94. It embodies a series of side-by-side ring-shaped laminations the outer edge portions of which are exposed to the air in the inner space 36 in the box-like housing 22.

Referring now to Figure 13, the rotor of the generator 24 consists of a composite horizontally extending shaft 118 and certain windings 119 around the shaft. The shaft consists of a spindle-like inner part 120 and a tubular outer part 121. The two parts of the shaft are positioned centrally in the generator shell 94 and are in longitudinal alignment with the crank shaft 74 of the internal combustion engine 23. The spindle-like inner part 120 is tapered in the direction of the housing end wall 28 and embodies on its inner end an integral outwardly extending annular flange 122. The latter abuts against the crank shaft flange 81 and is fixedly connected thereto by way of an annular series of screws 123 to the end that the inner part 120 of the composite shaft 118 is connected for drive by the engine crank shaft 74. As shown in Figure 13 the fly wheel 83 is ring-shaped and extends around the outwardly extending annular flange 122 on the inner end of the shaft part 120. The inner marginal portion of the fly wheel 83 is provided with an annular seat 124 for the outer portion of the flange 122 and is driveably connected to said flange by way of an annular series of bolts 125. The tubular outer part 121 of the shaft 118 of the generator rotor embodies on its central portion an integral crosswall 126 and has its inner end portion in surrounding relation with the central and outer end portion of the spindle-like shaft part 120. The inner periphery of the inner end portion of the outer shaft part 121 is inwardly tapered in conformity with the taper on the inner shaft part 120. A longitudinally extending key 127 fits in opposed keyways in the central and outer end portions of the spindle-like shaft part 120 and the inner end portion of the tubular outer shaft part 121 and forms a driving connection between the two parts. A bolt 128 extends through a central hole 129 in the crosswall 126 and into a screw threaded socket 130 in the outer end portion of the outer shaft part 120 and serves to clamp the two shaft parts together. The outer end portion of the tubular outer shaft part 121 extends snugly through a circular hole 131 in the center of the end wall 109 of the cup-shaped outer part 98 of the generator shell and terminates in the central portion of the closed chamber 110. The end portion of the tubular shaft part 121 that is disposed in the chamber 110 is provided with collector rings 132 which as shown in Figures 13 and 20 are engaged by movably mounted brushes 133. Such brushes are carried by a bracket 134 which is disposed in the upper portion of the chamber 110 and is suitably mounted on the central portion of the end wall 108 of the cup-shaped outer shell part 98. By positioning the collector rings 132 and the brushes 133 in the closed chamber 110 in the central portion of the cup-shaped outer shell part 98, they are isolated from the interior of the shell and hence any dust in the cooling air that flows through the shell interior cannot be deposited on them and result in faulty operation of the generator.

*Engine and generator accessories*

The various and sundry accessories for the internal combustion engine 23 and the alternating current generator 24 are all located in the box-like housing 22. They are of standard or conventional design and construction and hence a detailed description of them is unnecessary. As shown in Figures 3 and 21, the accessories for the engine consist of an electric starter 135, a suction fan 136, a pair of filters 137 (Figures 3 and 12) for the lubricating oil for the engine, a filter 138 for the engine fuel oil, and an oil bath variety air filter 139. The accessories for the generator 24 consist of a plurality of rectifiers 140 (Figures 11 and 21) and a pre-cleaner 141.

The electric starter 135 is located directly over the cylinder block end to which the cup-shaped inner part 97 of the generator shell is attached. It comprises an elongated casing 135a and an armature (not shown) in the casing. The casing 135a extends lengthwise of the box-like housing 22 and has the end thereof that is nearer to the housing end wall 28 bolted or otherwise fixedly secured to the hood-like member 107 on the upper portion of the continuous side wall 100 of the cup-shaped inner shell part 97. The armature of the starter 135 is mounted for axial sliding movement in the casing 135a and embodies a horizontally extending shaft 142 (Figures 12 and 13) one end of which is disposed in the aforesaid hood-like member 107 and has mounted thereon a pinion 143. The pinion is adapted in connection with axial shift of the starter armature in one direction to be brought into driving engagement with a ring gear 144 on the outer periphery of the engine fly wheel 83. When the pinion is in mesh with the ring gear in connection with drive of the starter, the starter operates to turn the crank shaft 74 for engine starting purposes. It is contemplated that the starter will be controlled automatically by any suitable control device which is preferably located in the compartment 37.

The electric suction fan 136 is located in the left hand end of the inner longitudinal space 36 in the box-like housing 22 as viewed in Figure 13 and consists of a cylindrical frame 145, a stator 146 and a rotor 147. It is contemplated that the fan will be controlled automatically so that it operates only when the temperature of the coolant in the radiator 87 rises to a predetermined degree due to operation of the Diesel type internal combustion engine 23. It is also contemplated that the switch and other control units for the fan will be located in the compartment 37. When the fan is in operation, it serves to draw outside air into the space 36 via the rectangular horizontally extending opening 51 in the inner side wall 27 of the housing and to cause such air to flow first through the radiator, then around and past the generator 24 and finally back to the outside of the housing via a circular hole 148 in the housing end wall 28. The cylindrical frame 145 of the suction fan 136 fits and is suitably secured within the circular hole 148 and has its inner or inlet end flared to a slight extent. The stator 146 is positioned centrally within the frame 145 and is supported by way of radially extending struts 149 the inner ends of which are welded to the stator and the outer ends of which are welded to the inner peripheral portion of the frame 145. The rotor 147 is positioned directly inwards of, and in coaxial relation with, the stator and embodies an annular series of angularly disposed outwardly extending blades 150. When the suction fan 136 is not in operation, the outer end of the cylindrical frame 145 is closed by a damper 151. The latter has at the upper portion thereof hinges 152 which have certain parts thereof fixedly connected to the outer surface of the housing end wall 28 and permit the damper to swing back and forth between a closed position wherein it extends vertically downwards and covers the outer end of the cylindrical frame 145 (as shown in full lines in Figure 13) and an open full line position wherein it extends away from the outer end of the frame (see dotted lines in Figure 13). When the fan is at rest, the damper assumes its closed position in response to gravity. When the fan is in operation, the pressure of the exhausted air serves to swing and maintain the damper in its open position. By arranging the suction fan as illustrated and described, the air that is circulated thereby operates not only to effect cooling of the radiator 87 for the engine but also to absorb heat from the exposed parts of the generator 24.

The lubricating and fuel oil filters 137 and 138 (Figures 3 and 12) for the engine 23 are disposed normally in the right hand end portion of the outer longitudinally extending space 35 as viewed in Figure 3 in the housing interior. They are positioned in side-by-side and spaced apart relation and are suitably mounted against the inner face of a panel 153 which is normally disposed in an upright position directly inwards of the access opening 48. The bottom margin of the panel 153 is connected by hinges 154 to the subjacent portions of the elevated upper part 31 of the housing bottom wall 25. The hinges 154 are so arranged and designed that when the cover plate 49 is removed, the panel 153 may be swung outwards and downwards through the access opening 48 into a position wherein it is disposed exteriorly of the outer side wall 26 of the housing and the filters 137 and 138 are readily accessible for inspection and repair purposes as shown in Figure 9. After inspection or repair of the filters, it is contemplated that the panel 153 will be swung upwards and inwards into its normal or operative position wherein it extends vertically as shown in Figure 12. It is also contemplated that after swinging of the panel into its operative position, the access opening 48 will be closed by securing in place the cover plate 49. The filters 137 for the engine lubricating oil are provided with hose type connections between them and the engine and serve in connection with engine operation to filter the lubricating oil as it is continuously circulated. The fuel oil filter 138 is interposed in a flexible connection which leads from the fuel storage tank 93 to a metering pump (not shown) for controlling the flow of fuel under pressure to the injectors 76.

The oil bath variety air cleaner 139 (Figures 3, 16, 17 and 21) for the engine is positioned in the rear or inner portion of the compartment 39 as viewed in Figure 3 and serves to remove dust and other foreign particles from the air which is supplied to the engine cylinders by way of the intake manifold 75. It is of conventional or standard construction and embodies an air inlet 155 and an air outlet 156. The air inlet 155 is located at the top portion of the oil bath variety air filter 139 and is communicatively connected by a substantially vertical conduit 157 to the air outlet member 106 on the outer side portion of the continuous side wall 100 of the cup-shaped inner shell part 97. The aforesaid conduit 157 is disposed in the compartment 39 and has at its lower end a right angle elbow 158 the inlet or receiving end of which extends horizontally through a hole 159 in the extension-formed partition 34 and is suitably connected to said air outlet member 106. The upper end of the conduit 157 embodies a right angle elbow 160 the outer or outlet end of which is suitably connected to the air inlet 155 of the oil bath variety air filter 139. The air outlet 156 of the filter is communicatively connected by a conduit 161 to the end of the engine intake manifold 75 that abuts against the partition 42 and is in alignment with the hole 85 (Figure 11). The conduit 161 extends substantially vertically and is located in the compartment 39. The upper end of the conduit 161 is provided with a right angle bend 162 the end of which is suitably connected to the air outlet 156 of the air filter 139. The lower end of the conduit 161 is provided with a right angle bend 163 the outer end of which is provided with an outwardly extending annular flange 164 which abuts against the portion of the partition 42 that defines the hole 85, and is connected by bolts 165 to the outwardly extending flange 84 on the air inlet end of the intake manifold 75. The conduits 157 and 161 together form a single conduit which has the oil bath variety air filter 139 interposed therein and extends and establishes communication between the air outlet member 106 on the continuous side wall of the cup-shaped inner part 97 of the generator shell and the air inlet end of the intake manifold 75 of the engine.

The rectifiers 140 (Figures 11 and 21) are disposed in the compartment 38 and serve to convert or change into direct current the alternating current that is produced by the generator 24 for excitation and battery charging purposes. The compartment 38 in which the rectifiers 140 are disposed is provided at the front end thereof with an air outlet opening 167. The air inlet opening 166 is formed in the front portion of the partition 41 and coacts with the air outlet opening 167 to permit air to flow past the rectifiers for cooling purposes. The air outlet opening 167 is formed in the extension-formed partition 34 and is connected by a conduit 168 to the outer end of the tangentially disposed air inlet opening 117 on the upper portion of the continuous side wall 109 of the cup-shaped outer shell part 98.

The pre-cleaner 141 is located in the front portion of the compartment 39 (see Figures 3, 9, 10 and 11) and serves to clean in a preliminary manner the air which enters the compartment 39 via the grille-equipped opening 50 in the removable cover plate 49 and flows into the rectifier compartment 38 via the air inlet opening 166 in the front portion of the partition 41. It is of conventional or standard design and construction and embodies an air inlet (not shown) and an air outlet member 169. The aforementioned air inlet is in communication with the interior of the compartment 39, and the air outlet member 169 has the outer end thereof arranged so that it fits snugly within the air inlet opening 166 for the rectifier compartment 38.

*Operation*

As previously pointed out, it is contemplated that the electric suction fan 136 will be automatically started as soon as the temperature of the coolant for the internal combustion engine 23 rises to a predetermined degree. In connection with operation of the engine, suction is created in the intake manifold 75 of the engine. Such suction results in the following: first, outside air enters the compartment 39 via the grille-equipped opening in the cover plate 49, then the air flows into and through the pre-cleaner 141 wherein dust and other foreign particles are removed from it, then the air enters the rectifier compartment 38 via the air inlet opening 66, then the air after flowing through the compartment 38 and past the rectifiers 140 enters the interior of the generator via the air outlet opening 167, the conduit 168 and the tangentially disposed air inlet member 117, then the air after flowing through the generator and past the stator 95 and the rotor 96 flows into the oil bath variety air filter 139 via the air outlet member 106, the conduit 157 and the air inlet 155, and finally the air after flowing through the filter 139 is delivered to the inlet end of the intake manifold 75 via the air outlet 156, the conduit 161 and the hole 85. The aforementioned air in connection with flow thereof through the compartment 38 serves to cool the rectifiers 140. When such air flows through the generator it operates to absorb heat from, and thereby cool, the stator and rotor of the generator. The air which enters the intake manifold is in heated form as the result of absorption of heat from the rectifiers and the stator and rotor of the generator. As the result of such air being in heated form, it tends when entering the cylinders of the engine to facilitate combustion and thus effect an increase in engine efficiency.

The electric suction fan 136 in connection with operation thereof serves as previously pointed out to cause outside air to enter the inner space 36 via the opening 51 in the inner side wall 27 of the box-like housing and then to flow successively past the radiator 87 and the external parts of the generator before being exhausted from the housing interior via the circular hole 148 in the housing end wall 28. The air that is caused to circulate in connection with operation of the fan serves to absorb heat from the radiator and also from the generator.

The herein described engine-generator unit effectively fulfills its intended purpose and possesses high efficiency as the result of the particular manner in which the rectifiers, the generator and the engine radiator are cooled. The cooling of such parts together with the supply of heated air to the air intake manifold of the engine provides the desired thermal balance so far as the engine and generator are concerned. By arranging the engine, generator and accessories as heretofore described and constructing the box-like housing in the manner set forth, the unit as a whole occupies but a comparatively small amount of space. Because of the various access openings in certain of the walls of the housing, the various operating parts of the unit may be radially inspected or repaired when the unit is shifted into its inspection position.

Whereas the engine-generator unit has been described in connection with a railroad refrigerator car, it is to be understood that it has other capabilities of use. It is also to be understood that the invention is not to be restricted to the details set forth since such details may be modified within the scope of the appended claims without departing from the spirit and scope of the invention.

Having thus described the invention what we claim as new and desire to secure by Letters Patent is:

1. An engine-generator unit comprising a multi-cylinder internal combustion engine having a piston-driven crank shaft and in addition an intake manifold in communication with its cylinders, and an electric generator positioned adjacent to the engine, consisting of an elongated shell, a stator, and a rotor with a shaft therefor, having one end of the shell provided with a closed chamber in isolated and substantially sealed relation with respect to the generator interior and into which chamber an end of the rotor shaft projects, having one end of the rotor shaft connected for drive by the engine crank shaft and the other end of said rotor shaft projecting into the closed chamber, embodying in said chamber collector rings on the projecting end of the rotor shaft and movably mounted brushes in operative relation with the rings, also embodying means in the form of an inlet and an outlet for permitting air to flow through said generator interior and past the stator and rotor, having said inlet communicating with the interior of the generator shell through said one end thereof but out of communication with said closed chamber, and having said outlet connected to the intake manifold of the engine in order that when the engine is in operation the suction that is created in the manifold causes air to bypass said closed chamber and flow past, and absorb heat from, said stator and rotor and then enter said intake manifold in a heated condition.

2. An engine-generator unit according to claim 1 and in which the shell of the generator consists of two complemental oppositely positioned spaced apart cup-shaped parts, the generator stator is disposed between the two shell parts and embodies a series of side-by-side ring-shaped laminations, the chamber is formed by the provision of a well in the central portion of one of the shell parts, the inlet is connected to the side wall in the vicinity of said well of said one shell part, and the outlet is connected to the other shell part.

3. An engine-generator unit comprising a box-like housing having means forming in a part of the housing interior an isolated normally closed compartment with an inlet and an outlet for permitting air to flow therethrough, an engine mounted in another part of the housing interior, an electric generator mounted in still another part of the housing interior, positioned adjacent to, and connected for drive by, the engine, consisting of a shell, a stator and a rotor and embodying means in the form of an inlet and an outlet for permitting air to flow through the shell and past the stator and rotor, generator rectifiers mounted in the compartment, a conduit extending between, and connected to, the compartment outlet and the generator inlet, and means for causing air to flow first through the compartment in order to absorb heat from the rectifiers and then through the generator shell in order to absorb heat from the said stator and rotor.

4. An engine-generator unit comprising a box-like housing having means forming in a part of the housing interior an isolated normally closed compartment with an inlet and an outlet for permitting air to circulate therethrough, an internal combustion engine mounted in another part of the housing interior and provided with an air intake manifold therefor, an electric generator mounted in still another part of the housing interior, positioned adjacent to, and connected for drive by, the engine, consisting of a shell, a stator and a rotor, and embodying means in the form of an inlet and an outlet for permitting air to flow through the shell and past the stator and rotor, generator rectifiers mounted in the compartment, a conduit extending between, and connected to, the compartment outlet and the generator outlet, and a conduit extending between, and connected to, the generator outlet, and the engine intake manifold, said engine being adapted in connection with operation thereof to have the suction that is created in said intake manifold cause air first to flow through the compartment in order to absorb heat from the rectifiers, then to flow through the generator shell in order to absorb heat from the stator and rotor and finally to enter the manifold in a heated condition.

5. An engine-generator unit comprising a box-like housing having means forming in a part of its interior two isolated normally closed side-by-side compartments one of which has an opening for permitting inflow therein of outside air and the other of which has an inlet and an outlet for permitting air to flow through it, an internal combustion engine mounted in another part of the housing interior and provided with an air intake manifold, an electric generator mounted in still another part of the housing interior, positioned adjacent to, and connected for drive by, the engine, consisting of a shell, a stator and a rotor, and embodying means in the form of an inlet and an outlet for permitting air to flow through the shell and past the stator and rotor, generator rectifiers mounted in the other compartment, an air pre-cleaner mounted in the one compartment, embodying an air inlet and an air outlet and having its air inlet in communication with the air in said one compartment and its air outlet connected to the inlet for said other compartment, a conduit extending between, and connected to, the outlet for said other compartment and the generator inlet, and a conduit extending between, and connected to, the generator outlet and the intake manifold, said engine being adapted in connection with operation thereof to have the suction that is created in the intake manifold cause outside air to enter said one compartment, then to flow successively through the air pre-cleaner, said other compartment and the generator, and finally to enter the said manifold.

6. An engine-generator unit comprising a box-like housing having means forming in a part of its interior two isolated normally closed side-by-side compartments one of which has an opening for permitting inflow therein of outside air and the other of which has an inlet and an outlet for permitting air to flow through it, an internal combustion engine mounted in another part of the housing interior and provided with an air intake manifold, an electric generator mounted in still another part of the housing interior, positioned adjacent to, and connected for drive by, the engine, consisting of a shell, a stator and a rotor, and embodying means in the form of an inlet and an outlet for permitting air to flow through the shell and past the stator and rotor, generator rectifiers mounted in the other compartment, an air pre-cleaner mounted in the one compartment, embodying an air inlet and an air outlet and having its air inlet in communication with the air in said one compartment and its air outlet connected to the inlet for said other compartment, a conduit extending between, and connected to, the outlet for said other compartment, a conduit extending between, and connected to, the outlet for said other compartment and the generator inlet, a conduit extending between, and connected to, the generator outlet and the intake manifold and disposed for the most part in said one compartment, an oil bath variety filter mounted in said one compartment and interposed in, and communicatively connected to, the last mentioned conduit, said engine being adapted in connection with operation thereof to have the suction that is created in the intake manifold cause outside air first to enter said one compartment, then to flow successively through the air pre-cleaner, said other compartment, the first mentioned conduit, the generator, and said last mentioned conduit and the filter, and finally to enter said manifold.

7. An engine-generator unit comprising a horizontally elongated box-like housing consisting of bottom, side, end and top walls, embodying in one end wall thereof a large sized rectangular longitudinally extending exposed opening, and provided in one of its end walls with a hole, a multi-cylinder straight line internal combustion engine mounted in, and extending lengthwise of, the end portion of the housing interior that is inwards of the other end wall, and having a liquid cooling system including a radiator shaped substantially conformably to, and disposed directly inwards of, said opening in the one side wall of the housing, an electric generator mounted in the other end portion of the housing interior, positioned adjacent to, and connected for drive by, the engine, and consisting of a shell, a stator and a rotor, and a rotary power driven suction fan mounted adjacent to the hole in the one end wall of the housing and operative when driven to draw outside air into the housing interior via said opening, then to cause such air to flow successively past the engine, the radiator, the engine and the generator for cooling purposes and finally to be exhausted through said hole back to atmosphere.

8. An engine-generator unit according to claim 7 and in which the shell of the generator consists of two complemental oppositely disposed spaced apart cup-shaped parts, and the generator stator is disposed between said cup-shaped parts and embodies a series of side-by-side ring-shaped laminations the outer edge portions of which are exposed to the air flow that results from operation of the fan.

9. An engine-generator unit according to claim 7 and in which the engine is provided with an air intake manifold, the generator embodies means in the form of an inlet and an outlet for permitting air to flow through the shell and past the stator and rotor, and said intake manifold of the engine is connected to the outlet in order that when the engine is in operation the suction that is created in the manifold to cause air to flow past, and absorb heat from, said stator and rotor and then enter the intake manifold in a heated condition.

10. An engine generator unit comprising a horizontally elongated box-like housing consisting of bottom, side, end and top walls, embodying in one end portion of one of its side walls a rectangular longitudinally extending access opening, and provided with a removable cover plate for normally closing said opening, an internal combustion engine mounted in the housing interior in opposed relation with the aforesaid opening and provided with lubricant and fuel filters, an electric generator mounted in the housing interior and connected for drive by the engine, and a normally upstanding panel disposed directly inwards of the opening, having the aforesaid filters mounted on the inner surface thereof, and provided at its bottom margin with hinge means whereby when the cover plate for the access opening is removed the panel may be swung outwards and downwards through said access opening into a position wherein the filters are disposed exteriorly of the housing and are readily accessible for inspection or repair purposes.

References Cited in the file of this patent

UNITED STATES PATENTS

| | | |
|---|---|---|
| 1,239,647 | Ver Planck | Sept. 11, 1917 |
| 1,399,853 | Ferguson | Dec. 13, 1921 |
| 1,778,036 | Noble et al. | Oct. 14, 1930 |
| 1,924,462 | Scofield | Aug. 29, 1933 |
| 2,019,026 | Spear et al. | Oct. 29, 1935 |
| 2,179,962 | Scott | Nov. 14, 1939 |
| 2,355,208 | Devol et al. | Aug. 8, 1944 |